United States Patent
Erdfarb

[11] Patent Number: 6,103,974
[45] Date of Patent: Aug. 15, 2000

[54] PAINTER'S PROTECTION DEVICE

[76] Inventor: Jeffrey Erdfarb, 1305 Dickerson Rd., Teaneck, N.J. 07666

[21] Appl. No.: 08/893,877

[22] Filed: Jul. 11, 1997

[51] Int. Cl.[7] ................................................ H02G 3/14
[52] U.S. Cl. ........................ 174/66; 174/67; 220/3.8; 33/528; D8/352
[58] Field of Search .................. 174/66, 67; 220/3.8, 220/241, 242; 33/528, DIG. 10; D8/352

[56] References Cited

U.S. PATENT DOCUMENTS

| | | | |
|---|---|---|---|
| 3,565,038 | 2/1971 | Van Barriger | 118/504 |
| 3,745,664 | 7/1973 | Altseimer | 33/528 |
| 3,859,454 | 1/1975 | Mann | 174/66 |
| 4,357,898 | 11/1982 | Fehrenbacher | 118/504 |
| 4,656,058 | 4/1987 | Stark | 118/504 X |
| 4,695,486 | 9/1987 | Stark | 118/505 X |
| 4,747,366 | 5/1988 | Walker | 118/504 |
| 4,791,007 | 12/1988 | Gleason et al. | 118/504 X |
| 4,825,805 | 5/1989 | Walker | 118/504 |
| 5,056,458 | 10/1991 | Askeland | 118/505 |
| 5,063,872 | 11/1991 | Maus et al. | 118/213 |
| 5,143,238 | 9/1992 | Bardaville | 33/528 X |
| 5,187,853 | 2/1993 | Bardaville | 33/528 X |
| 5,432,979 | 7/1995 | Harper | 118/505 X |
| 5,526,952 | 6/1996 | Green | 220/3.8 |

*Primary Examiner*—Dean A. Reichard
*Attorney, Agent, or Firm*—Eitan, Pearl, Latzer & Cohen-Zedek

[57] ABSTRACT

This invention provides a paint cover, including a) a plate having a front and rear surface; b) the front surface having a top, bottom and side portions; c) top, bottom, and side continuous outer edges which project rearward from the front surface, wherein the outer edge is curved and tapered; d) the rear surface having a top, bottom and side portions; and e) a flexible arm extending rearwardly from each of the side portions of the rear surface, wherein the arms upon insertion into an outlet assembly frictionally engage the inside of the assembly so as to extend a force to secure the paint cover to an outlet box.

8 Claims, 8 Drawing Sheets

PAINTER'S PROTECTION DEVICE

BACKGROUND OF INVENTION

The present invention is directed to a new and improved paint cover for an electrical outlet or switch assembly. The cover can be quickly and easily installed to provide total coverage of the outlet and other exposed parts of an electrical switch and quickly and easily removed.

Preparing a wall for painting by brush, roller, or spray gun involves covering items, such as electrical switches, outlets, recessed lights, door knobs, and baseboard heating units. The process is cumbersome, time consuming, there is also a danger of electric shock when the tape is applied with a knife, the tape tears easily, may leave residue, and is not reusable.

Tape products which are used by painters to cover outlets and sockets are manufactured by the 3M Corporation and the Daubert Coated Products Co. Also, safety caps and covers are made for the purpose of covering electrical sockets and switches for the purpose of "child proof protection".

SUMMARY OF THE INVENTION

This invention provides a paint cover, comprising: a) a plate having a front and rear surface; b) the front surface having a top, bottom and side portions; c) top, bottom, and side continuous outer edges which project rearward from the front surface, wherein the outer edge is curved and tapered; d) the rear surface having a top, bottom and side portions; and e) a flexible arm extending rearwardly from each of the side portions of the rear surface, wherein the arms upon insertion into an outlet assembly frictionally engage the inside of the assembly so as to extend a force to secure the paint cover to an outlet box.

The present invention has objects, features and advantages that will become more apparent in connection with the following detailed description of preferred embodiments, taken in conjunction with the appended drawings.

DETAILED DESCRIPTION OF THE PREFERRED EMBODIMENTS

The present invention is directed to a cover for wall-mounted electrical switches, outlets, baseboard heating units, door knobs, door hinges, and recessed lights for protection from paint. Specifically, a cover plate fits over and removably adheres to a recessed light, a wall-mounted electrical box or to an electrical component fixed to the box such as an outlet or electrical switch, wherein the cover plate prevents paint from contacting the cover plate of the outlet assembly or any other exposed surfaces thereof as the wall is painted.

The present invention also provides a paint cover, comprising: a) a plate having a front and rear surface; b) the front surface having a top, bottom and side portions; c) top, bottom, and side continuous outer edges which project rearward from the front surface, wherein the outer edge is curved and tapered; d) the rear surface having a top, bottom and side portions; and e) a flexible arm extending rearwardly from each of the side portions of the rear surface, wherein the arms upon insertion into an outlet assembly frictionally engage the inside of the assembly so as to extend a force to secure the paint cover to an outlet box. In one embodiment the flexible arms may be ribbed.

In one embodiment the plate cover may be generally rectangular, square or circular shaped. It is contemplated by this invention that the cover is made of a plastic or similar material. The outer edge is curved and tapered inward so as to contact a wall which contains an outlet assembly which prevents paint from contacting the outer assembly. The outlet assembly may be an electrical outlet or an electrical switch.

It is contemplated that the length and width of the cover are made preferably slightly smaller than the standard length and width of a wall plaque, so that there will be no unpainted perimeter. In another embodiment the cover plate is a rectangular or square dimensioned plate or cover, preferably made of a one-piece plastic. For example, the cover may be dimensioned as 3 inches length by 2 and ⅜ inches width. In another embodiment the cover may be dimensioned as 6 inches length by 4 and ⅜ inches width. In another embodiment the cover may be dimensioned as 8 inches length by 6 and ⅜ inches width.

In one embodiment the cover is integrally formed with a first raised portion, rectangular in shape and adapted to fit over an electrical outlet or switch box. The cover is further formed with a second raised portion adapted to allow for the switch finger in the case where the device to be covered is an electrical switch. In one embodiment the front surface is molded so as to permit clearance of a toggle element of a switch outlet assembly. The clearance may be 1 and ⅛ inches in length so as to cover the switch. Also, it is contemplated that a tab means is connected to, or an aperture is formed within, the front surface of the cover.

It is contemplated by this invention that the arms may be made of any material which frictionally engage the inside of the outlet assembly so as to extend a force to secure the paint cover when inserted into the outlet assembly. For example, the arms are made of a metal, plastic, or alloy material. In one embodiment one flexible arm extends rearward from each of the side portions of the rear surface. Each arm may extend from the middle of the side portions or at other positions on the side portions. In another embodiment two flexible arms extend rearward from each of the side portions of the rear surface. In one embodiment one flexible arm extends rearward from each of the top and bottom portions of the rear surface. In another embodiment two flexible arms extend rearward from each of the top and bottom portions of the rear surface. It is understood that the flexible arms extend from the top, bottom and side portions of the front surface. It is contemplated that the length of the arms may vary. For example, the length of the arm may be 2 inches, 1 inch, ½ inches, or ⅜ inches.

The cover is inserted into the outlet box by pushing the prongs into the outlet assembly or recessed light until the respective rear surface cover the outer respective side surfaces of the cover plate of the outlet assembly. The prongs frictionally hold the cover in place, and no external surfaces of the outlet assembly are exposed to the application of paint. Once the wall regions around the outlet are painted, the shield can be removed by pulling on the tab and then reused at another outlet where needed.

Figure 5:
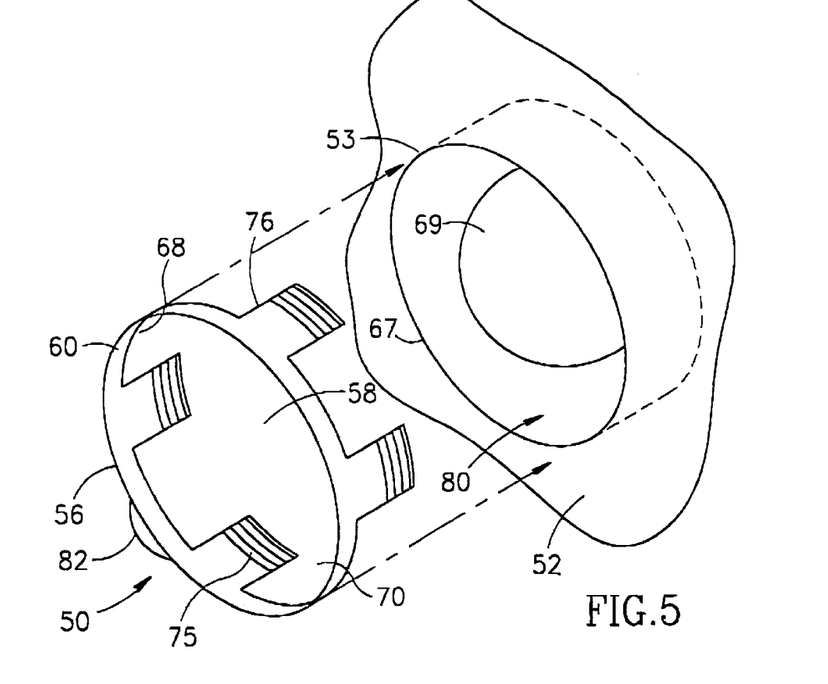
FIG. 5 shows an exploded side perspective view showing an embodiment of a paint cover according to the invention to be inserted into a recessed light assembly.
Figure 6:
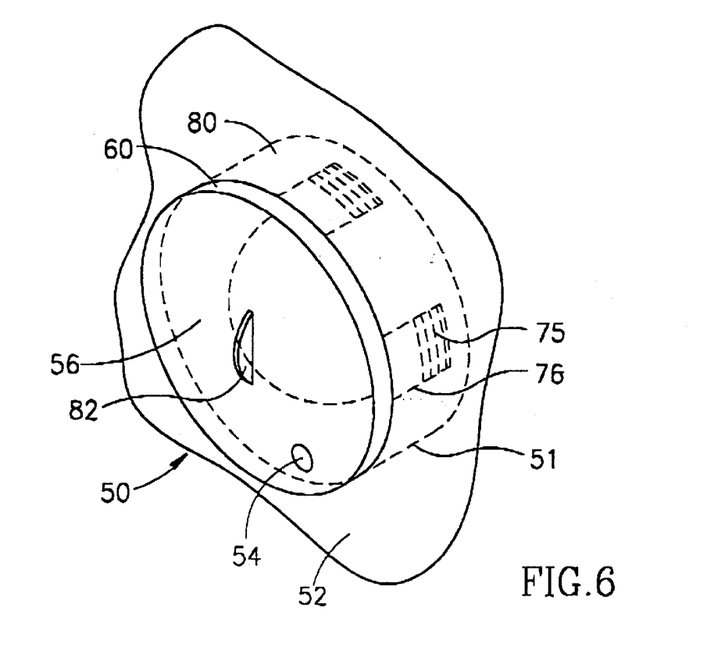
FIG. 6 shows a side perspective view of the paint cover inserted into a recessed light assembly.

It is contemplated by this invention that when the cover is of a circular shape the cover is made preferably slightly larger than the standard circumference of the inside of a recessed light, so that there will be no unpainted perimeter of the recessed light as shown in FIGS. 5–6.

The invention also provides a paint cover, comprising: a) a plate having a front and rear surface; b) the front surface joined at its peripheral edges to a surface, which projects rearwardly of the front surface; d) the rear surface having a plurality of flexible arms extending rearwardly from the rear surface, wherein the arms upon insertion into recessed light frictionally engage the inside of the light so as to extend a force to secure the paint cover. In one embodiment the flexible arm is ribbed.

The use of the paint shields of the present invention provides total coverage of all exposed parts of an electrical outlet or switch so that they are not contacted by paint, which makes it unnecessary to remove any cover plates or to mask any surfaces. The shields are inexpensive to make, and are reliable and easy to use and reuse. Since certain changes or modifications may be made in the disclosed embodiments without departing from the inventive concepts involved, it is the aim of the appended claims to cover all such changes and modifications falling within the true spirit and scope of the present invention.

The present invention also provides a paint cover for an air conditioning vent, comprising: a) a plate having a front and rear surface; b) the front surface having a top, bottom and side portions; c) top, bottom, and side continuous outer edges which project rearward from the front surface, wherein the outer edge is curved and tapered; d) the rear surface having a top, bottom and side portions; and e) a means for attaching said paint cover. In one embodiment the paint cover contains a magnet or a plurality or multiplicity of magnets on the any or the surfaces or portions of the cover. Dimensions of air conditioning vents are known to those skilled in the art. For example, the cover may be 11¼×11¼ inches, 11¼×7¼ inches, or 11¼×5¼ inches and have a depth of 1¼ inches.

This invention provides a shield for protecting a baseboard heating unit from paint, which comprises a first rigid, elongated member having a front and rear surface defined between parallel lateral sides, the front and rear surface having a proximal and distal end; a second rigid member having a front and rear surface defined between parallel lateral sides, the front and rear surface of the second member having a proximal and distal end, wherein the proximal end of the first member is connected to the distal end of the second member so as to form a right angle (90 degree angle) between the first and second members; and a third rigid member having a front and rear surface defined between parallel lateral sides, the front and rear surface of the third member having a proximal and distal end, wherein the proximal end of the second member is connected to the distal end of the third member so as to form a right angle (90 degree angle) between the second and third members. In one embodiment the angles formed between the members may be in a range of 45 degrees to 150 degrees. In one embodiment the cover may be dimensioned as 4–15 inches in length of the first member, 2–7 inches in length of the second member, and 1–5 inches in length of the third member.

This invention provides a paint cover comprising a hollow perforated hollow cylindrical form having a forward and rear section, wherein the rear section is closed and the forward section is adapted to be passed over a door knob and engages the surface of the knob mount. In one embodiment the edges of the forward section are molded to be slightly larger than the door knob mount so as to frictionally engage the mount.

This invention provides a paint cover for a butt hinge for protection from paint, comprising a cover having a front and rear surface defined between parallel lateral sides, wherein the cover contains an aperture.

Figure 1A:
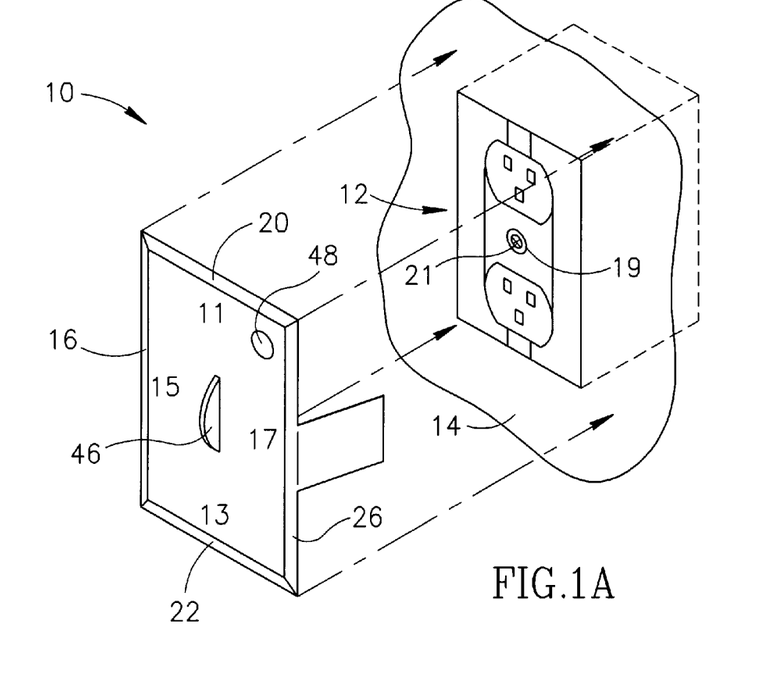
FIG. 1A shows an exploded side perspective view showing an embodiment of a paint cover according to the invention to be inserted into an electric outlet assembly.
Figure 1B:
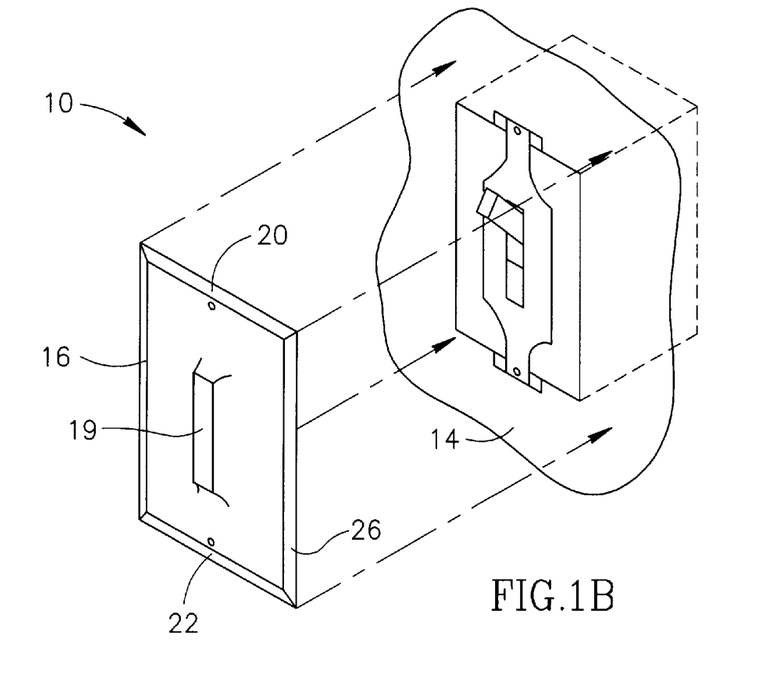
FIG. 1B shows an exploded side perspective view showing an embodiment of a paint cover according to the invention to be inserted into an electric switch assembly.

Referring to FIGS. 1 and 2, a cover plate indicated generally at 10 is shown opposite a standard electrical outlet 12 mounted within a wall 14. When the cover 10 is positioned over the electrical outlet 12, it will be securely attached to and completely cover all exposed surfaces of the outlet during a paint job.

Figure 4:
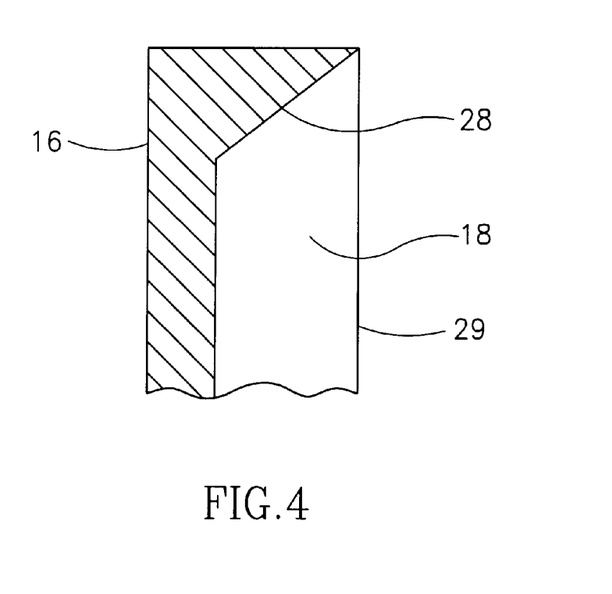
FIG. 4 shows a fragmentary sectional view of the continuous outer edge of the paint cover of FIG. 1.

The cover 10, which preferably is made of a plastic material, which may be molded 17 (FIG. 1B), has a front surface 16 and a rear surface 18. The front surface has a top 11, bottom 13 and side 15, 17 portions which are joined at its peripheral edges to a top edge 20, a bottom edge 22 and to opposite side edge 24 and 26. Each of these edges project rearwardly of the front surface 16 as shown. Each edge has an inner surface 28 that curves and tapers toward the outer wall surface thereof as shown in FIG. 4. The tapered construction provides the surfaces with the thin edge sections that are relatively flexible and dimensioned to provide a fairly tight fit against the respective side surfaces of the cover plate.

The cover 10 is dimensioned such that the inner edge sections 20, 22, 24, and 26 fit closely against the wall in which an electrical outlet is mounted within 18 when the cover is positioned thereover to prevent paint from contacting any exposed surface of the assembly. Thus when paint is applied to the wall surface thereto, it is inhibited from getting underneath the edge sections and on the side or front surfaces of the cover plate.

Figure 2A:
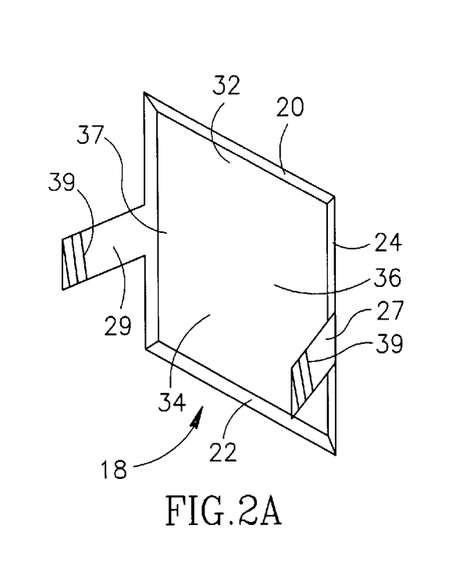
FIG. 2A shows a rear perspective view of the paint cover having a flexible arm which extends from the middle of each of the side portions of the rear cover.
Figure 2B:
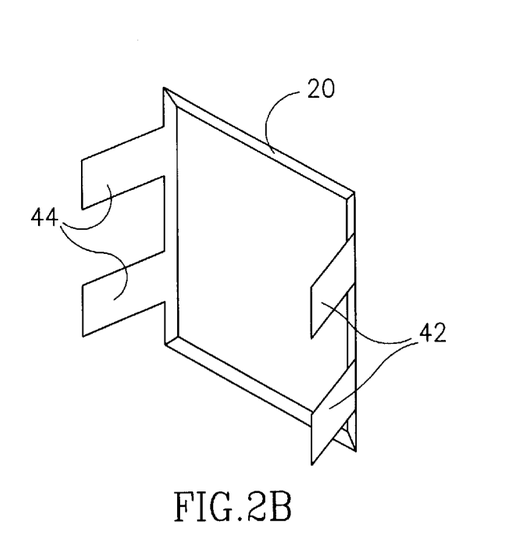
FIG. 2B shows a rear perspective view of the paint cover having a pair of flexible arms which extend from the middle of each of the side portions of the rear cover.
Figure 2C:
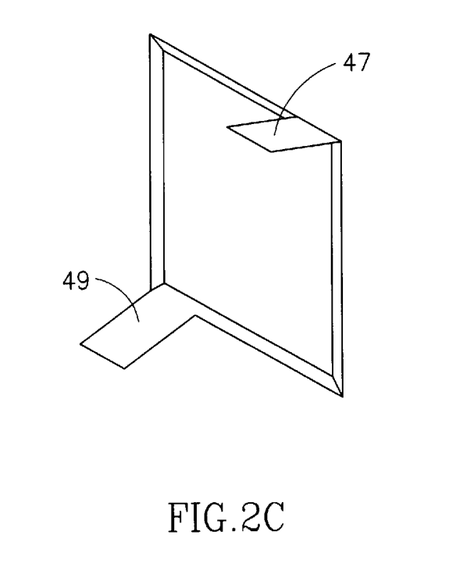
FIG. 2C shows a rear perspective view of the paint cover having a flexible arm which extends from each of the top and bottom portions of the rear cover.
Figure 2D:
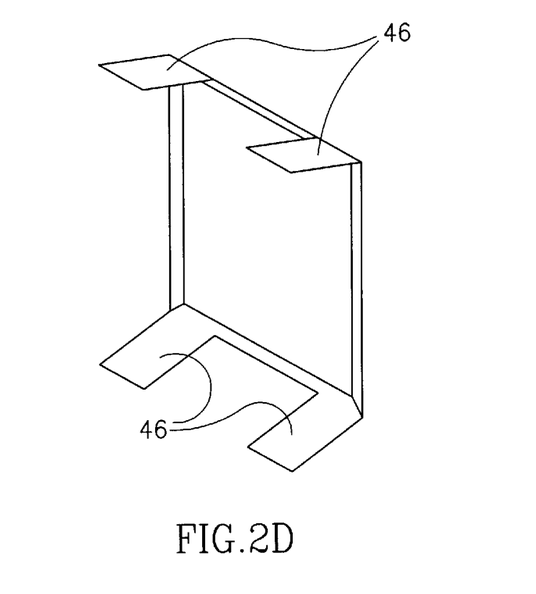
FIG. 2D shows a rear perspective view of the paint cover having a pair of flexible arms which extend from each of the top and bottom portions of the rear cover.
Figure 3:
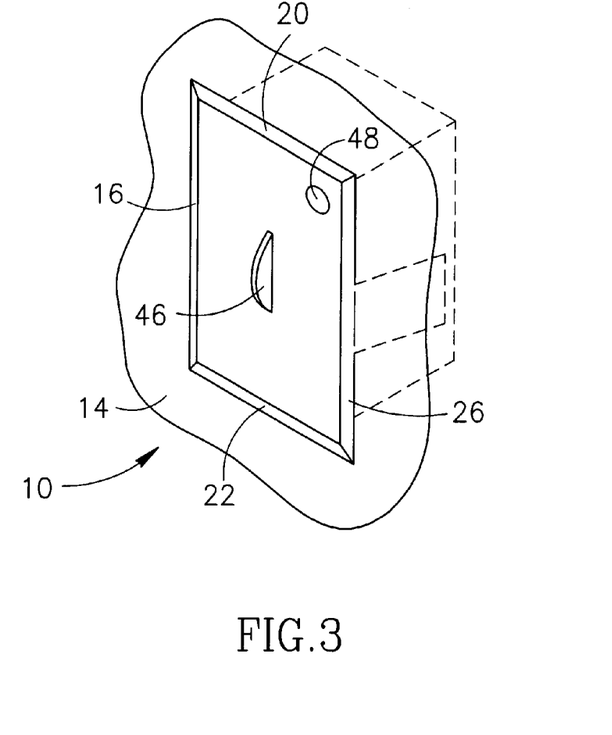
FIG. 3 shows a side perspective view of the paint cover inserted into the outlet box.

The rear surface 18 of the cover 10 is made of an top 32, bottom 34 and side 36, 37 portions which has flexible arm, projections or prongs 38 from each of the side portions 27, 29 of the rear surface. Alternatively, (FIG. 2B ) the side portions 36 of the rear surface 30 has a pair of flexible arms, projections or prongs 42 and 44 from each side portion of the rear surface. As shown in FIGS. 2C and 2D the top and bottom and side portions may have a single arm 45 extending from each of the top 47 and bottom 49 of the rear portion or a pair of parallel arms 46 extending from the top, bottom portions of the rear surface. The arms may be ribbed 39. Thus when the arms 38, 46 are inserted into the outlet 12 they frictionally engages the side 13 or top 15 of the outlet 12. It is contemplated that the cover contain a rigid member 17 positioned in the middle of the rear of the cover so as to be inserted into an aperture 19 of the outlet for which a screw may be inserted 21.

In order to later remove the cover 10, a tab 46 or aperture 48 is on the front surface of the cover 10. The tab 46 or aperture 48 can have a generally semi-circular shape, although other shapes can be also effective, to allow the fingers and thumb to be used to position and remove the cover 10. Preferably the tab 46 is positioned in the middle of the front surface 48. Preferably the aperture 48 is positioned in side of the top and bottom portions of the front surface.

It is contemplated by this invention that when the cover is of a circular shape the cover is made preferably slightly larger than the standard circumference of the inside of a recessed light, so that there will be no unpainted perimeter of the recessed light as shown in FIGS. 5–6.

Referring to FIG. 5, a cover indicated generally at 50 is shown opposite a standard recessed light fixture 51 mounted within a ceiling 52. When the cover 50 is positioned over the recessed light fixture, it will be securely attached to and completely cover all exposed surfaces of the light during a paint job.

The cover 50, which preferably is made of a plastic material, has a front surface 56 and a rear surface 58. The front surface is joined at its peripheral edges to a surface 60, which projects rearwardly of the front surface as shown. The edge has an inner surface 68 which when the cover is inserted onto the light covers the bottom surface 67 of the light fixture. Thus when paint is applied to a surface containing the light, it is inhibited from getting underneath the cover plate.

The rear surface 70 of the cover has a pair of parallel flexible arms, projections or prongs 76. Thus when the arms 76 are inserted into the recessed light they frictionally engage the inside walls 80 of the recessed light. The arms may be ribbed 75.

In order to later remove the cover, a tab 82 is on, or an aperture 84 is contained within, the front surface of the cover. The tab and aperture can have a generally semi-circular shape, although other shapes can be equally effective, to allow the fingers and thumb to be used to position and remove the cover. Preferably the tab and aperture are positioned in the middle of the front surface Referring to FIGS. 7–8, a baseboard cover indicated generally at 82 is shown attached to a baseboard heating unit 84. When the cover 82 is positioned over the baseboard, it will cover all exposed surfaces of the baseboard heating unit during a paint job.

Figure 7:
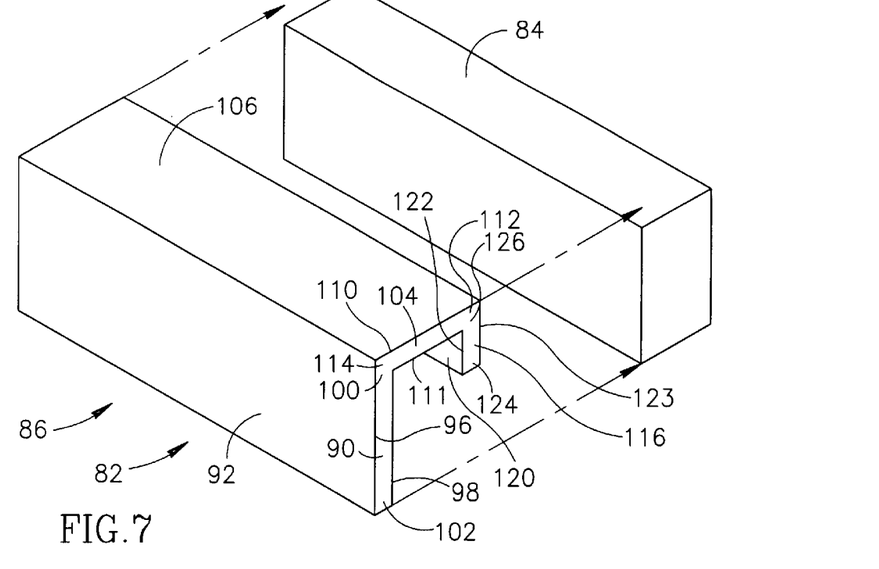
FIG. 7 shows an exploded side perspective view showing an embodiment of a baseboard cover according to the invention attached to the baseboard unit.
Figure 8:
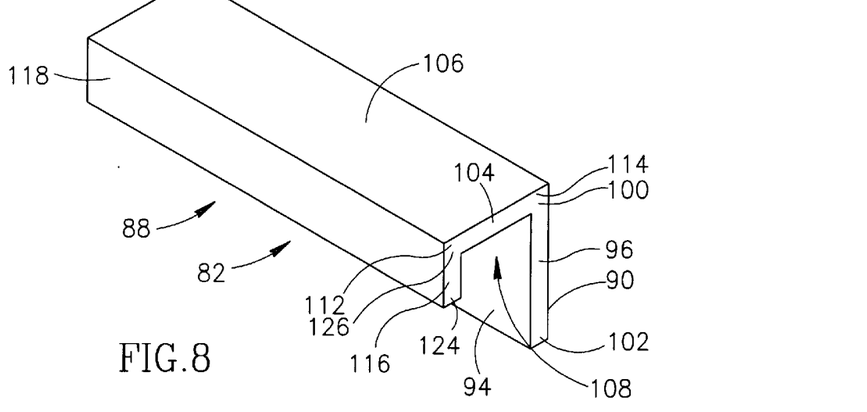
FIG. 8 shows a rear perspective view of the baseboard cover.
Figure 9:
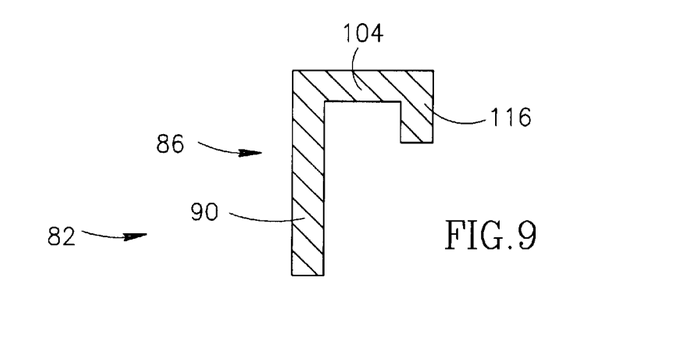
FIG. 9 shows a cross-sectional perspective view of the baseboard cover of FIG. 7.

The cover 82, which preferably is made of a plastic material, has a front surface 86 and a rear surface 88 comprises a first rigid, elongated member 90 having a front 92 and rear 94 surface defined between parallel lateral sides 96 and 98, the front and rear surface having a proximal 100 and distal 102 end; a second rigid member 104 having a front 106 and rear 108 surface defined between parallel lateral sides 110, 111 the front and rear surface of the second member having a proximal 112 and distal 114 end, wherein the proximal end of the first member is connected to the distal end of the second member so as to form a right angle between the first and second members; and a third rigid member 116 having a front 118 and rear 120 surface defined between parallel lateral sides 122, 123 the front and rear surface of the third member having a proximal 124 and distal 126 end, wherein the proximal end of the second member is connected to the distal end of the third member so as to form a right angle between the second and third members.

Figure 10:
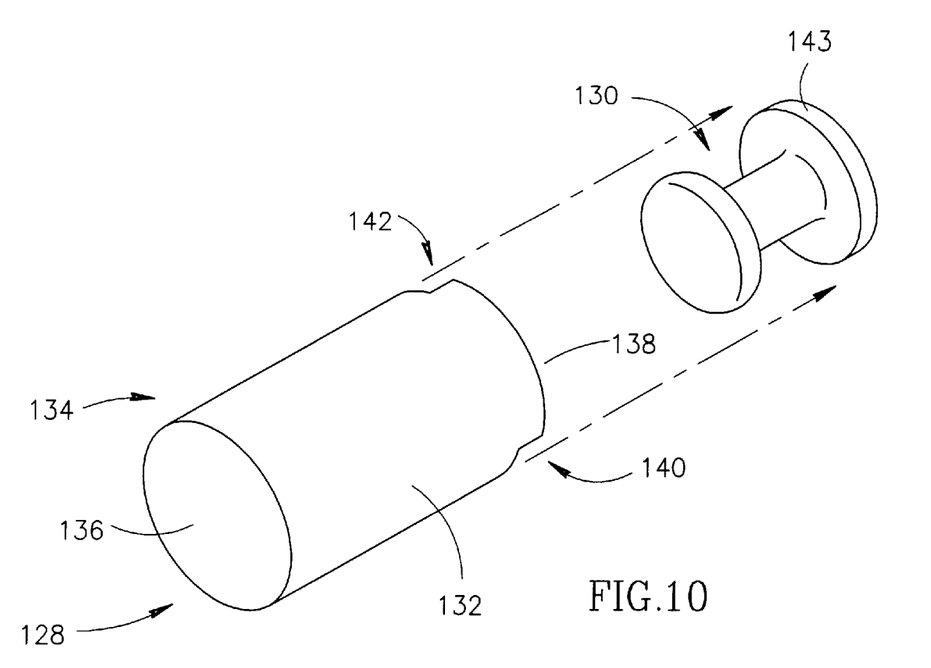
FIG. 10 shows an side exploded perspective view showing an embodiment of a door knob cover according to the invention attached to a door knob.
Figure 12:
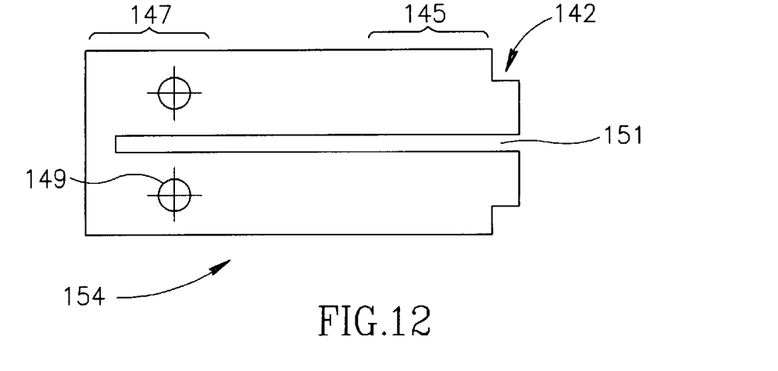
FIG. 12 shows a transverse perspective view of the door knob cover of FIG. 10.

Referring to FIGS. 10 and 12, a door knob cover indicated generally at 128 is shown attached to a door knob 130. When the cover is positioned over the door knob, it will cover all exposed surfaces of the knob during a paint job. The cover 128, comprises a hollow cylindrical form 132 having a rear section 134 which is closed 136; and a forward 138 section, wherein the forward section is open and adapted at 140 to be passed over a door knob and engage the surface of the knob mount. In one embodiment the door knob cover 128 contains a transverse aperture 151 from the forward section to the rear section. In one embodiment the peripheral edges 142 of the forward section are molded to be slightly smaller than the door knob mount so as to frictionally engage the mount 143. In one embodiment the cylinder has a proximal 145 and distal 147 end which at the distal end contains a single or a pair of apertures 149.

Figure 11:
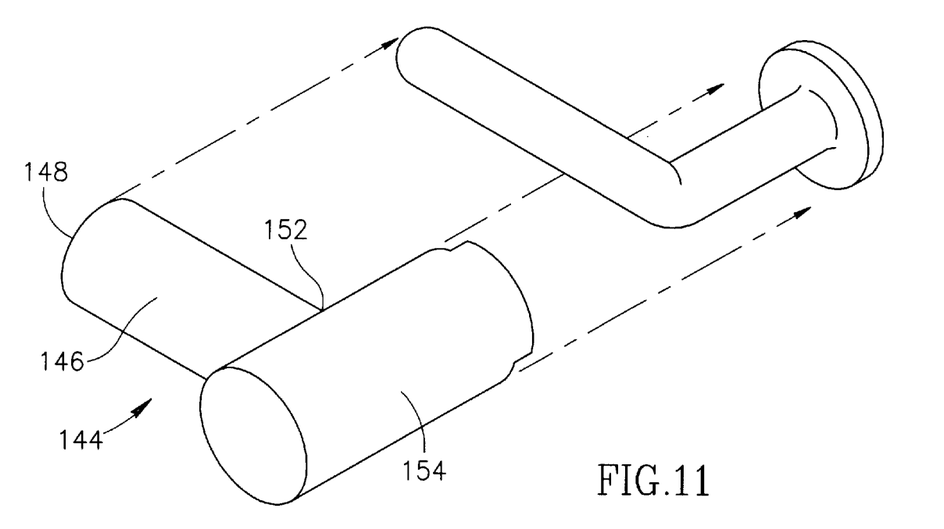
FIG. 11 shows an side exploded perspective view showing the door knob cover covering with a door flair section covering.
Figure 13:
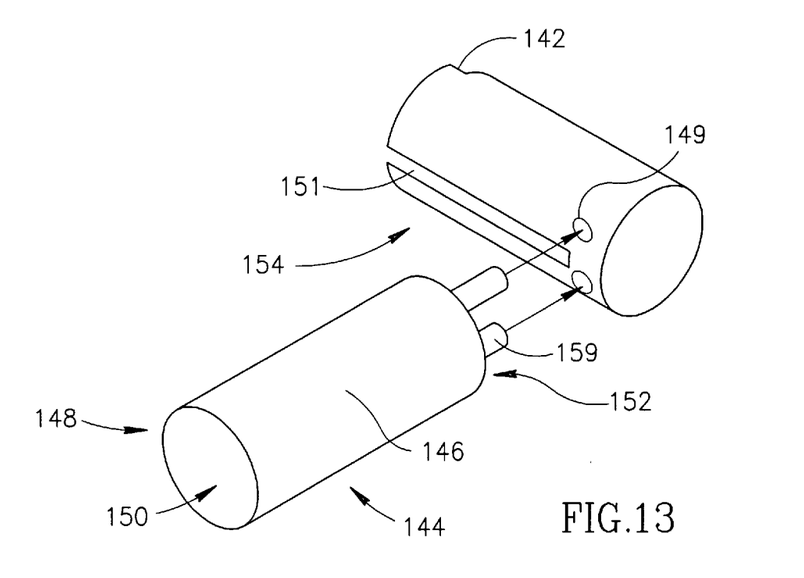
FIG. 13 shows an exploded perspective view showing an embodiment of the door flair cover attached to the door knob cover.
Figure 14:
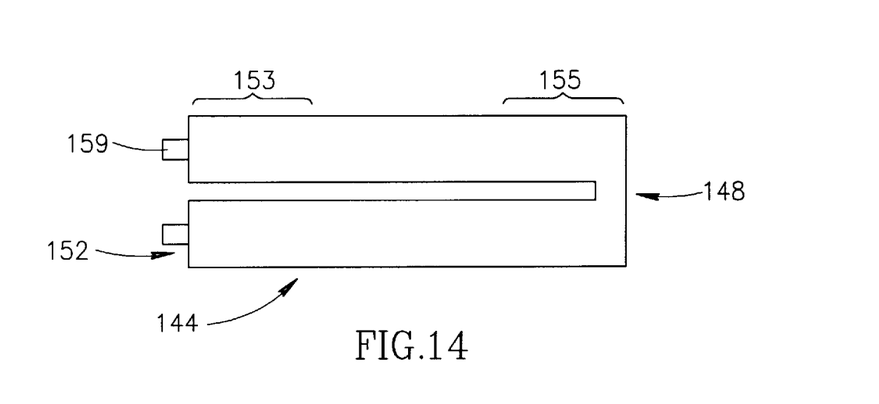
FIG. 14 shows a side perspective view of the door flair cover.

As shown in FIGS. 11, and 13, a flair knob covering indicated generally at 144 is shown attached to the door knob cover. The flair cover 144, comprises a hollow cylindrical form 146 having a rear section 148 section which is closed 150; and a forward 152 section, wherein the forward section is adapted to be passed over a flair section of a door knob and engage the door knob cover 154. In one embodiment the cylinder has a proximal 153 and distal 155 end in which a single or a pair of insertion members 159. In one embodiment the door flair contains a transverse aperture 157 from the forward section to the rear section.

Figure 15:
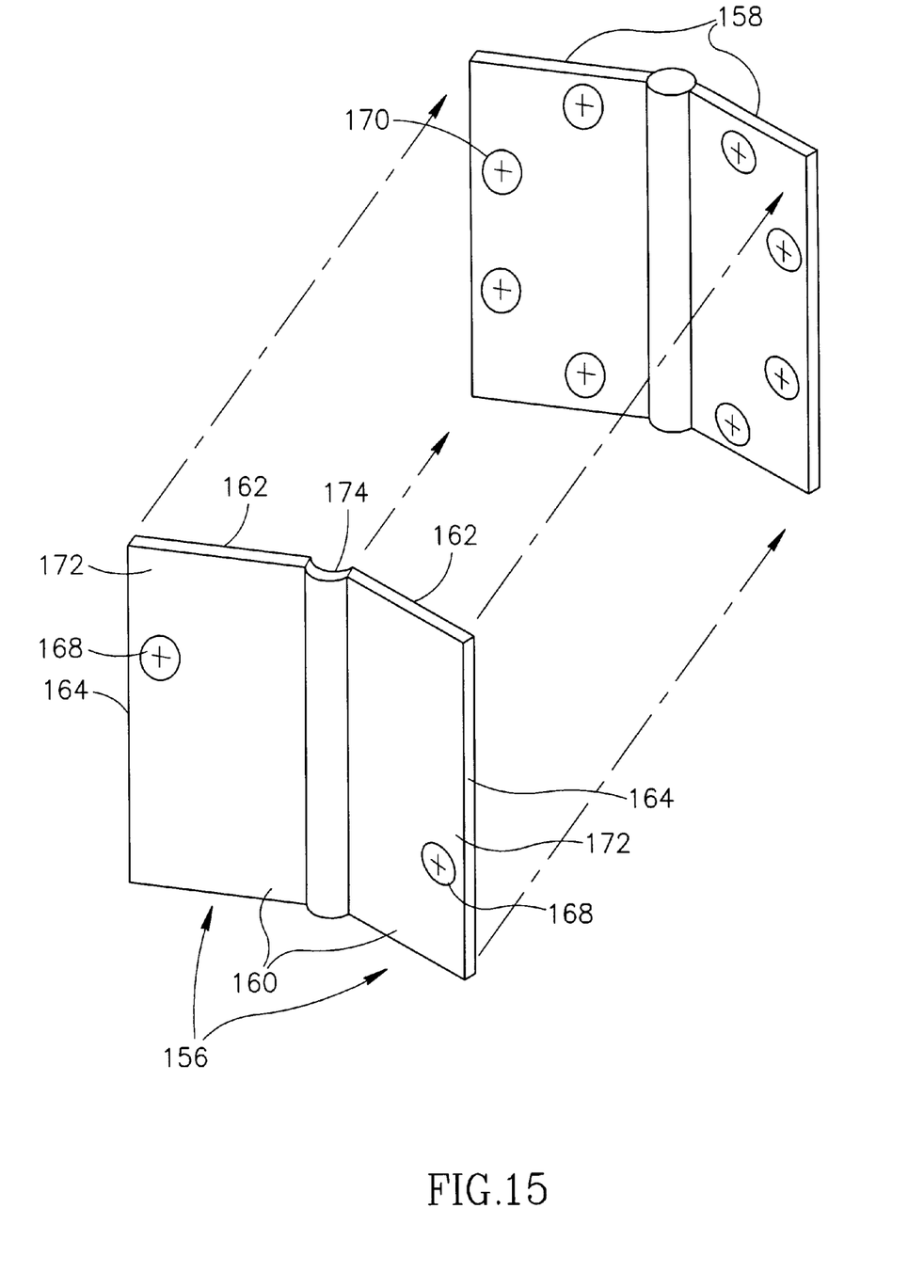
FIG. 15 shows a front perspective view of the door hinge cover.

Referring to FIG. 15, a door hinge cover indicated generally at 156 is shown attached to a door hinge 158. When the cover is positioned over the door hinge, it will be cover all exposed surfaces of the hinge during a paint job. The cover 158, comprises a front 160 and rear 162 surface defined between parallel lateral sides 164, wherein the cover contains an aperture 168. Preferable, the aperture 168 is positioned to cover a door hing aperture in which a screw is placed into 170. In one embodiment the cover includes two leaf portions 172 joined in pivotal 174 side-by-side relationship at vertically aligned portions 176.

Although several embodiments have been shown and described, those skilled in the art will realize that numerous variations and modifications can be made without departing from the spirit of the invention. The invention is not limited to the preferred embodiments and its scope is defined only by way of the following claims:

What is claimed is:

1. A paint cover, comprising: a) a plate having a front and rear surface; b) the front surface having a top, bottom and two side portions; c) top, bottom, and two side continuous edges which project rearward from the front surface, wherein the edges are carved and tapered; d) the rear surface having a top, bottom and two side portions; and e) a flexible arm extending rearwardly from each side of the side portions of the rear surface, wherein the arms upon insertion into an outlet assembly frictionally engage an inside of the assembly so as to exert a force to secure the paint cover to an outlet box.

2. The paint cover of claim 1, wherein the plate has a generally rectangular, square, or circular shape.

3. The paint cover of claim 1, wherein the plate is made of a plastic material.

4. The paint cover of claim 3, wherein the plate is molded.

5. The paint cover of claim 4, wherein the plate is integrally formed with a first raised portion having a rectangular shape and adapted to fit over an electrical or switch box.

6. The paint cover of claim 1, wherein each of the flexible arms extend from a central portion of one of the side portions of the rear surface.

7. The paint cover of claim 1, further comprising a second flexible arm which extends rearwardly from each of the side portions of the rear surface.

8. The paint cover of claim 1, wherein each of the flexible arms is ribbed.

* * * * *